Jan. 13, 1959

J. M. SHELLY 2,868,242

LIQUID MOLDING MACHINE

Filed July 20, 1955

2 Sheets-Sheet 1

INVENTOR.
JACOB M. SHELLY
BY
ATTORNEYS

United States Patent Office 2,868,242
Patented Jan. 13, 1959

2,868,242

LIQUID MOLDING MACHINE

Jacob M. Shelly, Lansdale, Pa., assignor to Shelly Brothers, Inc., Lansdale, Pa., a corporation of Pennsylvania Application July 20, 1955, Serial No. 523,282

5 Claims. (Cl. 141—137)

This invention relates to a liquid molding machine and, more particularly, to apparatus for discharging a fluid material into molds carried by a moving conveyor.

It is the primary object of the invention to provide apparatus by means of which molds carried by a moving conveyor may be successively filled with a fluid material without interrupting the travel of the conveyor and, further, to actuate the mold filling portion of the apparatus by movement of the conveyor.

Figure 1:
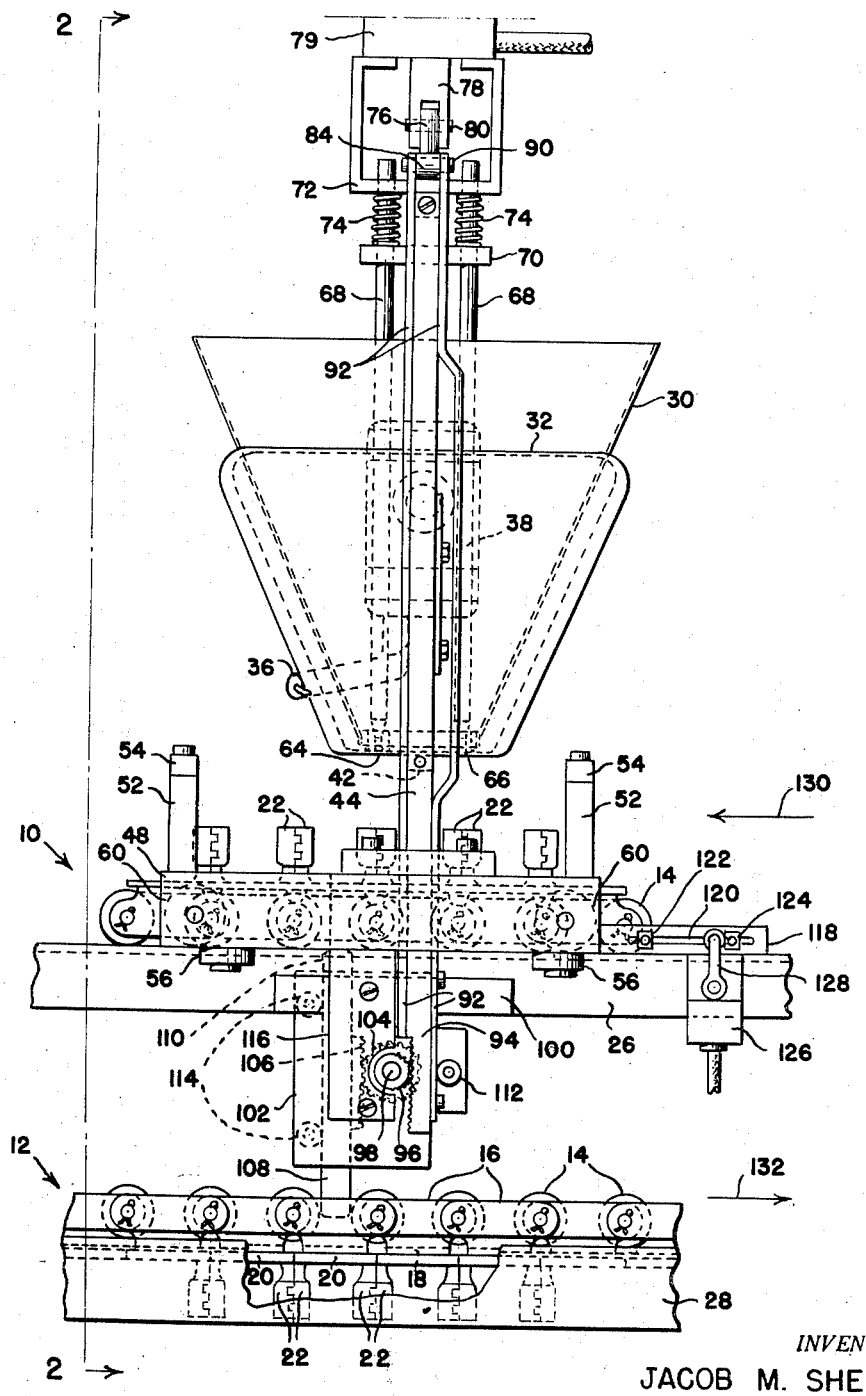
Figure 2:
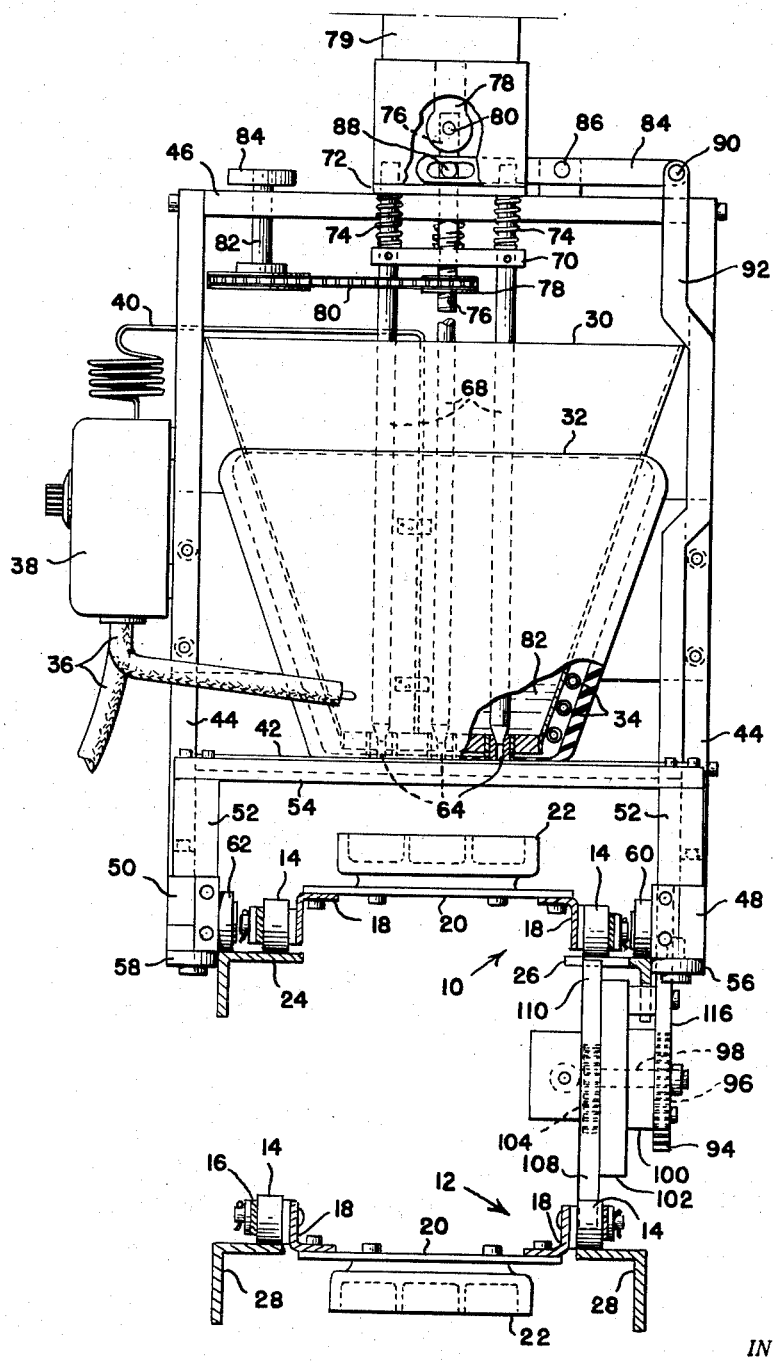

These and other objects of the invention will become apparent from the following description when read in conjunction with the accompanying drawings, in which:

Figure 1 is a side elevation of the apparatus showing a fragmentary portion of the conveyor; and Figure 2 is a transverse section through a portion of the conveyor taken adjacent to the filling apparatus and showing the filling apparatus.

The conveyor is in the form of an endless chain and roller type of conveyor the upper reach of which is indicated generally at 10 and the lower reach of which is indicated generally at 12 in the figures. The conveyor includes rollers 14 connected by links 16 positioned externally of the rollers and angle brackets 18 positioned internally of the rollers. Plates 20 are mounted to transversely adjacent brackets 18 and are arranged to be in substantially abutting relation when the conveyor chain is in straight line arrangement as shown in Figure 1. Mold halves 22 are affixed to each end of each of the plates 20 and are arranged to be in closed mold forming relation, as shown in Figure 1, when the conveyor is in straight line arrangement as shown in Figure 1.

When the endless conveyor is carried around a radius, the plates 20 will be displaced and the mold halves 22 will separate, permitting the material contained within the molds to fall out of the molds. This is entirely conventional type of conveyor and mold mounting arrangement and it is believed that the foregoing description will be adequate to describe the type of conveyor employed herein. It will also be evident that any conventional conveyor driving means and control therefor may be employed.

The rollers 14 of the upper reach of the conveyor ride on angle tracks 24 and 26 and the rollers 14 of the lower reach of the conveyor ride on angle tracks 28. Also riding on the upper reach angle tracks 24 and 26 is a material feeding apparatus which will now be described.

An open hopper 30 adapted to contain liquid material to be delivered to the molds 22 is surrounded by an insulated jacket 32 containing electrical heating elements 34 connected to supply conduits 36 under the control of a thermostat 38. The thermostat 38 includes a temperature sensing tube 40 which is extended into the liquid contained within the hopper 30. Thus the liquid in the hopper for delivery to the molds 22 is maintained at a desired temperature by means of the electric current flowing through the heating elements 34 under the control of the thermostat 38 in a conventional fashion.

The hopper 30 rests upon and is supported by a horizontally extending bar 42 supported between a pair of vertically extending members 44 joined together at their upper ends by a transversely extending bar 46. The lower ends of the vertically extending bars 44 are affixed to horizontally extending plates 48 and 50. The plates 48 and 50 are connected together at each of their ends by means of members 52 extending upwardly therefrom and horizontally extending members 54 connected to the upper ends of each pair of vertically extending members 52. Mounted below the plate 48 are rollers 56 which are in engagement with and roll upon the right-hand surface of the vertically extending flange of the angle track 26 as viewed in Figure 2. Affixed to the underside of the plate 50 are rollers 58 which roll upon the left-hand face of the vertically extending flange of the angle track 24 as viewed in Figure 2. Rollers 60 are mounted internally or to the left of the plate 48 as viewed in Figure 2 and ride upon the upper surface of the track 26. Rollers 62 are mounted internally of or to the right of the plate 50, as viewed in Figure 2, and ride upon the upper surface of the track 24. From the foregoing it will be evident that the hopper 30 is movable longitudinally along the same line as the conveyor travels on the conveyor angle tracks 24 and 26.

The bottom of the hopper 30 is provided with two sets of bores. The first of these, indicated at 64 in Figure 2, provides three openings in linear array positioned over one of the molds 22. As is shown in Figure 1, the array of openings 64 are positioned on one side of the frame member 44 and a second array of three similar openings, located at 66, are positioned above the second mold 22.

A group of six rods 68 extend vertically within the hopper 30 and have their lower ends tapered and adapted to close off the six bores 64. The upper end portions of the rods 68 pass through a plate 70 in fixed relation therewith and above the plate 70 the rods pass movably through a plate 72 fixed to the horizontally extending member 46. Springs 74 positioned around the rods 68 between the plates 72 and 74 urge the plate 70 and the rods 68 downwardly.

It will be noted that in Figure 2 the central rod 68 nearest the viewer is cut away at its upper end to show a short vertically extending rod 76 positioned in the center of the array of six rods 68. The rod 76 passes freely through the plate 70. The upper end of the rod 76 is affixed to a link 78 by means of a pin 80. The link 78 is connected to the armature of a solenoid 79 which serves to raise and lower the rod 76.

The lowermost end of the rod 76 is threaded and mounts an internally threaded sprocket 78 which is connected by means of a chain 80 to a sprocket affixed to a shaft 82 extending vertically through the frame member 46. A hand wheel 84 is affixed to the upper end of the shaft 82. By means of rotation of the hand wheel 84, the sprocket 78 is raised or lowered on the shaft 76.

When the solenoid 79 is energized, the rod 76 and the sprocket 78 are raised upwardly for a distance equal to the travel of the solenoid armature. The rod 76 passes freely through the plate 70 and, when the sprocket 78 engages the lower surface of the plate 70, the rods 68 will be raised against the urging of springs 74 and the bores 64 in the bottom of the hopper 30 are opened permitting the liquid material contained within the hopper 30 to flow downwardly out of the bores 64 in the bottom of the hopper. From the foregoing, it will be evident that the degree of movement of the rods 68 may be adjusted by rotation of the hand wheel 84 and thus the rate of flow of liquid material 82 from the hopper 30 into the molds 22 may be controlled by adjusting the hand wheel 84.

A horizontally extending link 84 is pivotally mounted at 86 to the frame member 46. The left-hand end of the link 84, as viewed in Figure 2, is pivotally connected to the rod 76 at 88. The right-hand end of the link 84 is pivotally connected at 90 to the uppermost ends of a pair of vertically extending bars 92. The lowermost end portions of the bars 92 are affixed to a rack bar 94 which is in engagement with a gear 96 affixed to a shaft 98 passing horizontally through a pair of plates 100 and 102. The left-hand end of the shaft 98, as viewed in Figure 2, mounts a gear 104 as best shown in Figure 1 which is in engagement with the gear teeth on a vertically extending rack 106 affixed to a bar having its lower end 108 adapted to pass between rollers 14 on the lower reach of the conveyor and having its upper end 110 adapted to pass upwardly between rollers 14 on the upper reach of the conveyor. It will be evident that the rack bar 108—110 will be moved upwardly and downwardly by the gear 104 in response to vertical motion of the bars 92 and operation of the solenoid 79.

Roller 112 is positioned behind the rack bar 94 and serves to hold the rack bar 94 in engagement with its driving gear 96. Similar rollers 114 are positioned behind the bar 108—110 and serve to hold the rack gear 106 into engagement with its driving gear 104. A plate 116 is mounted on the block 100 and extends upwardly and is mounted to the plate 48 serving to support the plates 100 and 102 from the plate 48.

Affixed to the right-hand end of the plate 48, as viewed in Figure 1, is a bar 118 provided with a slot 120 in which blocks 122 and 124 are mounted. A control switch 126 is affixed to the track 26 and has an upwardly extending arm 128, by which the switch is actuated, positioned so as to be engaged by the blocks 124 and 122 when the plate 48 is moved to the left and to the right, respectively, predetermined distances as viewed in Figure 1.

If it is assumed that in normal operation the upper reach of the conveyor, indicated generally at 10, moves to the left, as indicated by the arrow 130 in Figure 1, and the lower reach of the conveyor, indicated generally at 12, moves to the right, as indicated generally by the arrow 132 in Figure 1, then with the parts in the positions shown with the lower end of the bar 108 extending between the rollers 14 on the lower reach of the conveyor, the plates 48 and 50 and the hopper 30 will be moving to the right as viewed in Figure 1. When the block 122 engages the arm 128 of the control switch 126, the solenoid 79 will be energized, through conventional wiring not shown, the rods 68 will be raised opening the bores 64 in the bottom of the hopper 30 and the rack 106 will be raised upwardly moving the bar 110 between rollers 14 in the upper reach of the conveyor and moving the bar 108 from between the rollers 14 in the lower reach of the conveyor. This will cause the hopper and material discharge apparatus to move to the left, as viewed in Figure 1, at the speed of travel of the conveyor and, as will be evident from the arrangement of parts in Figure 1, the two sets of openings 64 and 66 in the bottom of the hopper will be positioned directly over molds 22.

When the bar 48 moves sufficiently to bring the block 124 into engagement with the arm 128 of the switch 126, the solenoid 79 will be deenergized. The springs 74 will move the bars 68 downwardly, closing off the bores 64 and 66, thus arresting flow of material from the hopper 30 into the mold cavities. Simultaneously, by operation of the link 84 and the bars 92, the rack 106 will be moved downwardly, the pin 110 will move out from between the rollers 14 of the upper reach of the conveyor and the bar 108 will move downwardly into the position shown in Figure 1 whereupon the apparatus will commence motion to the right in Figure 1 and the cycle of operation will be repeated.

From the foregoing it will be evident that the apparatus disclosed provides for the automatic delivery to a succession of molds carried by a conveyor of fluid material. The rate of flow may be adjusted so that during the time interval in which flow is occurring the desired amount of material is delivered to the mold cavities and, at the termination of the allotted time, the bores through which the material is flowing from the hopper are closed and the hopper is moved to the right, as viewed in Figure 1, for a distance of one mold space during which time the upper reach of the conveyor moves to the left for a distance of one mold space and thus the net relative motion between the hopper and the upper reach of the conveyor is two mold spaces and thus the openings 64 and 66 in the bottom of the hopper are positioned above two sets of unfilled mold cavities.

It will be evident that this apparatus which is extremely simple and practical serves to provide for the rapid filling of mold cavities carried by a continuously moving conveyor. In the manufacture of articles such as crystal candy toys a hot sugar syrup contained within the hopper 30 is retained at temperature at which it is sufficiently fluid to pass through the openings 64 and 66 into the mold cavities in the mold members 22. The length of the conveyor may be selected to be sufficient to allow the necessary time for the material to cool and set in the mold cavities before the endless link conveyor is passed around a sprocket wheel serving to open the molds at which point the set forms are removed from the mold cavities. The operation of the endless conveyor will, of course, serve to return the empty mold cavities to position under the hopper 30 for refill. It will be evident that the arrangement including the solenoid 79 described above is extremely simple and responsive. It is possible, though less desirable, to employ pneumatic or hydraulic control means in place of the electrical system shown. It will further be evident that numerous modifications may be made in the embodiment of the invention disclosed herein without departing from the scope of the invention as set forth in the following claims.

What is claimed is:

1. Apparatus for filling molds comprising means conveying a succession of molds, means for discharging a fluid material, means engageable with one portion of said conveying means for moving said discharging means in the direction of conveyor travel during discharge of material into a mold carried by said conveying means, means engageable with another portion of said conveying means for moving said discharging means in the direction opposite to the direction of said one portion of said conveying means travel to position the discharging means for discharge into a next successive mold carried by said conveying means, and means for arresting discharge of material from said discharge means when said discharge means is positioned between successive molds.

2. Apparatus for filling molds comprising endless conveying means having an upper reach and a lower reach for conveying a succession of molds, means for discharging a fluid material, means engageable with the upper reach of said conveying means for moving said discharging means in the direction of conveyor travel during discharge of material into a mold carried by said conveying means, means engageable with the lower reach of said conveying means for moving said discharging means in the direction opposite to the direction of conveyor travel to position the discharging means for discharge into a next successive mold carried by said conveying means, and means for arresting discharge of material from said discharge means when said discharge means is positioned between successive molds.

3. Apparatus for filling molds comprising endless conveying means having an upper reach and a lower reach for conveying a succession of molds, means for discharging a fluid material, means engageable with the upper reach of said conveying means for moving said discharging means in the direction of conveyor travel during discharge of material into a mold carried by said conveying means, means engageable with the lower reach of said conveying means for moving said discharging means in the direction opposite to the direction of conveyor travel to position the discharging means for discharge into a next successive mold carried by said conveying means, means for arresting discharge of material from said discharge means when said discharge means is positioned between successive molds, and solenoid operated means responsive to the position of said discharging means for actuating said two means for moving said discharging means and said material discharge arresting means.

4. Apparatus for filling molds comprising endless means conveying a succession of molds, means for discharging a fluid material, means alternatively engageable with oppositely moving portions of said endless means for successively advancing said discharging means for successive discharge into successive molds conveyed by said conveying means and returning said discharge means to its starting position, and means for arresting discharge of material from said discharge means when said discharge means is positioned between successive molds.

5. Apparatus for filling molds comprising endless means conveying a succession of molds, means for discharging a fluid material, means including a rack and gear actuated member alternatively engageable with oppositely moving portions of said conveyor for successively advancing said discharging means for successive discharge into successive molds conveyed by said conveying means and returning said discharge means to its starting position, and means for arresting discharge of material from said discharge means when said discharge means is positioned between successive molds.

References Cited in the file of this patent
UNITED STATES PATENTS

| | | |
|---|---|---|
| 1,700,494 | Harrington | Jan. 29, 1929 |
| 1,992,464 | Blackman | Feb. 26, 1935 |
| 2,265,702 | Sime | Dec. 9, 1941 |
| 2,340,637 | Bauer | Feb. 1, 1944 |
| 2,674,399 | Farley | Apr. 6, 1954 |